US006138922A

United States Patent [19]

Hartman et al.

[11] Patent Number: 6,138,922

[45] Date of Patent: Oct. 31, 2000

[54] ELECTROSTATIC SPRAY MODULE

[75] Inventors: William J. Hartman, Canby; Robert G. White, Portland, both of Oreg.

[73] Assignee: Progressive Grower Technologies, Canby, Oreg.

[21] Appl. No.: 09/437,083

[22] Filed: Nov. 9, 1999

[51] Int. Cl.[7] .................................................... A01G 23/10

[52] U.S. Cl. .................................................................... 239/3

[58] Field of Search ................................ 239/3, 704–706, 239/696, 707

[56] References Cited

U.S. PATENT DOCUMENTS

| | | | |
|---|---|---|---|
| 5,326,598 | 7/1994 | Seaver et al. | 427/473 |
| 5,765,761 | 6/1998 | Law et al. | 239/690.1 |

*Primary Examiner*—Andres Kashnikow
*Assistant Examiner*—Dinh Q. Nguyen
*Attorney, Agent, or Firm*—Marger Johnson & McCollom

[57] ABSTRACT

An electrostatic spray module for applying agricultural liquids such as a pesticide to crops where, externally to the spray module the number of connections is reduced to three, one for the liquid pesticide, one for compressed air and one for a low voltage signal. Internally to the spray module, the low voltage is converted to a high voltage signal, which is, along with the pesticide and the compressed air delivered to one or more electrostatic spray nozzles using only two electrically conductive pipes, a gas delivery pipe and a liquid delivery pipe. The nozzles fit into the gas delivery pipe and draw the compressed air through gas channel openings in the side of the nozzles. The gas delivery pipe doubles as the means to delivery the high voltage signal to the nozzles. Each nozzle has a liquid feed from the liquid delivery pipe, which carries ground voltage, maintaining the liquid at ground voltage. The grounded liquid merges with the compressed air in the nozzles to form an atomized liquid. The atomized liquid then passes through an electrode, which is electrically charged by the high voltage signal to form an electrostatic spray. The electrical charge in the spray leads to better dispersal of the spray due to the droplets in the spray repelling from each other, and further improves the adherence of the spray to crops which attract the charged droplets.

2 Claims, 5 Drawing Sheets

ELECTROSTATIC SPRAY MODULE

BACKGROUND OF THE INVENTION

This invention relates generally to electrostatic sprayers and more particularly to an electrostatic spray module for agricultural applications.

Electrostatic sprayers are commonly used in agricultural applications to apply pesticides and other agricultural chemicals to crops. Electrostatic sprayers typically work based on the following basic principles. Compressed air and liquid (for agricultural applications this is typically a pesticide) are separately piped into a nozzle, where the two mix in the process of atomization, forming small droplets of the liquid. The atomized liquid then passes through a charged electrode, in the process of induction, which charges the droplets. The droplets then, due to the flow of air, spray out to the crops. The charge on the droplets causes the individual droplets to repel from each other scattering the spray for an even and wide spread application. The charge on the droplets also leads to better application by causing the droplets to better adhere to the crops, which are at ground potential and electrically attract the charged droplets.

To sufficiently charge the liquid in an electrostatic sprayer, the nozzle needs a high voltage power source of generally one kilo-volt or higher. Electrostatic sprayers designed for use in the field use a low voltage power supply, such as a 12 V battery (typically the tractor battery), that is hooked up to a power supply that generates a high voltage signal. Some sprayers use one power supply for many nozzles, but have the complications of distributing high voltage over several nozzles. Many sprayers use one power supply per nozzle to keep the high voltage local to the nozzle but have the disadvantage of the high cost and maintenance of the many power supplies.

Systems incorporating individual electrostatic nozzles modules tend to be systems that are cumbersome to hook-up, difficult to configure, hard to maintain, have limitations in their performance and are costly to manufacture.

A "sprayer" in agricultural parlance refers to a electrostatic spray nozzle system or module as well as the supporting components of an air compressor, a liquid tank and pump, a frame and a boom, all of which are typically mounted on a tractor.

A standard sprayer typically comprises 30 to 80 nozzles each with several hoses and connections. Each nozzle in the sprayer requires a hose leading from the compressed air source, a hose leading from the liquid source and either a low voltage or high voltage power supply connection. Multiplying these three connections over the dozens of nozzles that are typically hooked to a tractor boom and the result is a cumbersome process for hooking up a sprayer system. This process can take considerable labor resources and result in a system that is extremely difficult to maintain.

Traditional sprayer systems also tend to have a fixed configuration, making changes to such things as the size of the nozzle opening and the spacing of the nozzles difficult, if not impossible, to alter after manufacturing. Changing the size of the opening in a nozzle affects the airflow through the nozzle, resulting in either lower airflow through the nozzle or a higher pressure. Varying the size of the nozzle opening may be desirable based on the type or stage of a crop. For example, a vineyard in springtime will consist of small plants where it will be preferable to use less air volume or pressure than later in the season when the plants are larger. Changing the spacing of the nozzles can also be difficult in prior art sprayer systems. A fixed distance between nozzles may not be desirable as different crops and different conditions have different nozzle requirements. For example, a sprayer used at a golf course will want full coverage over a flat surface, which will optimally be a nozzle every four inches or so. Meanwhile, a cotton crop has rows spaced such that a nozzle every twelve inches would provide adequate coverage.

Prior art sprayer systems are also difficult to maintain. The prior art nozzle described in Cooper et al., U.S. Pat. No. 5,704,554, shown in FIG. 1, has components, such as the electrode 2 and the liquid channels 5 integrated into the nozzle. Parts such as these may need routine cleaning for optimal use of the nozzle. Build up of dirt and liquid on the electrode can lead to inefficient spraying and excessive current draw on the power supply. Cleaning of the embedded electrode is awkward and can lead to damaging the surface of the electrode and the plastic enclosing the electrode. Cleaning the non-removable liquid channel is difficult. The tip of the liquid channel is subject to build-up of conductive deposits that create electrical current pathways and can lead to carbon deposits building up on the liquid channel tip. Excessive build up can damage the tip of the liquid channel, resulting in an inoperable nozzle. Excessive damage to the electrode or the liquid channel in a nozzle where such parts are non-replaceable requires complete replacement of the full nozzle.

Prior art sprayer systems also have performance limitations. The thin electrode 2 shown in the prior art nozzle of Cooper, et al., in FIG. 1 only provides a limited charge to the droplets, not fully maximizing their ability to attract to crops. Many prior art nozzles also have problems with the flow of the atomized liquid through the tip of the nozzle. This is caused by imperfections in the inner orifice wall of the tip of the nozzle. For example, the prior art nozzle of FIG. 1 has a stainless-steel electrode 2 embedded between plastic 1 and ceramic 3 layers, resulting in a three-layered passage from the end of the liquid channel 5 to the opening after the electrode 6. This three-layered channel of dissimilar materials, even with quality machining, has microscopic notches between the layers of materials. These notches magnify with wear and tear on the nozzle and the wear and tear, in turn, is accelerated by the damaging effects caused by the notching. As the air and liquid mixture flows out of the channel, the mixture eddies along the notches resulting in decreased charging of the spray, increased current draw and physical deterioration of the inner surface of the nozzle. The notching and the dissimilar materials can cause the liquid to be deflected to the side in its passage through the nozzle, causing an inefficient spray pattern and sub-optimal charging by the electrode. Another performance limitation in some prior art nozzles is an off-center spray, resulting from liquid channels that are not in complete coaxial alignment with the output of the nozzle. FIG. 1 shows a prior art nozzle that has a liquid channel with one end of the liquid channel centered about the electrode, but not the entire channel at the end is not straight upstream from the opening. An off-center liquid channel can result in a spray that is not centered around the end of the nozzle due to a lateral force in the liquid generated in the liquid's passage through the off-center liquid channel 5. Further, this can lead to plugging of the nozzle. Prior art nozzles also passively rely on the liquid maintaining ground potential which leads to unreliable charging of the spray.

Lastly, prior art sprayer systems are expensive. Due to the high cost of sprayer systems, their use is generally limited to high-value cash crops and specialty applications such as vineyards. The expense of prior art sprayer systems limits their use in commodity crops.

Therefore, there is a need for a system for electrostatically spraying agricultural crops that is easy for a user to set up, convenient to configure to different field situations and simple to maintain. Further, there is a room for improvement in the performance of sprayer systems as well as a strong need for more affordable systems.

SUMMARY OF INVENTION

The invention provides a system for electrostatically spraying crops that is designed for simplicity. The invention offers a simple plug-in setup that is easily serviceable and configurable. The invention also reduces the cost of manufacturing over prior art spray systems and delivers many performance enhancements in its simple and clean design.

According to the invention, these benefits are accomplished by enclosing an electrostatic spraying system in a protective casing with a single connection for each of the three system inputs: compressed air, liquid and a low voltage line. Internally, the new system delivers the three inputs to the nozzles using two conductive pipes: a liquid delivery pipe for distributing the liquid to the nozzle and an air delivery pipe for distributing the air to the nozzle. Each pipe also serves a dual purpose: the air delivery pipe carrying high voltage and the liquid delivery pipe hooked to ground to ensure the liquid remains at ground potential.

Each nozzle fits though an opening in the side of the air delivery pipe to receive the compressed air flowing through the air delivery pipe and to receive the voltage carried on the surface of the air delivery pipe. The nozzle body is made of a conductive material and has a removable conductive electrode mounted to the front of the body. The conductive body of the nozzle carries the charge from the air delivery pipe to the electrode. The nozzle receives the liquid from a branch off the liquid delivery pipe. The air and the liquid mix inside the nozzle and then pass through the charged electrode at the front end of the nozzle.

This simple and uncluttered design creates an electrostatic spray system that is easy to set-up for use and easy to maintain and configure. Externally, the user of the spray system has only three inputs to hook up for an entire bank of nozzles: a liquid supply input, a gas supply input and a low voltage electrical input. Further, with the power supply and all other components inside the protective casing, the user is protected from access to high voltages. The protective casing also provides protection of the spray system from the elements expected in the harsh field conditions of agricultural use.

Internally, the use of the liquid delivery pipe and the air delivery pipe to carry the liquid, air, ground potential and the charged potential greatly simplifies the multitude of tubes and connections necessary in the prior art. The power supply generates the high voltage from the low voltage input. The high voltage is carried to the nozzles by the conductive air delivery pipe, thereby eliminating the need for all high voltage wires. The use of the liquid delivery pipe to carry the liquid at ground potential eliminates the need for ground wires to each nozzle. The air delivery pipe feeds air directly to the bodies of the nozzles, eliminating the need for air delivery tubes and connections. Eliminating the numerous tubes and wires lead to a more maintainable system without connections prone to breaking and tubes with the potential to leak.

The nozzles too are designed for reliability and maintainability. Mixing of the air and liquid occurs after the liquid flows into shaft of the electrode. Atomized liquid therefore travels only though a passage of a single shaft made of one solid conductive metal piece before it passes through the outer ring of the electrode where the atomized liquid will pick up the majority of its charge. In the prior art nozzle, shown in FIG. 1, the atomized liquid passes through a channel composed of a dielectric layer 1, then the thin metal electrode 2 and back through a second dielectric layer 3. The multiple surfaces of the prior art lead to microscopic notching that magnify with wear and tear on the nozzle, causing eddies of liquid and air current through the shaft. The eddies along the notches result in decreased charging of the spray, increased current draw, the plugging of the nozzle and physical deterioration of the inner surface of the nozzle.

The liquid delivery pipe delivers the liquid to openings in the liquid delivery pipe connected to liquid connecting tubes. The liquid connecting tubes are made of an insulating material to isolate ground potential of the liquid delivery tube from the high voltage of the air delivery tube. The liquid connecting tube brings the liquid to a inner-nozzle liquid tube. The inner-nozzle liquid tube delivers the liquid through the nozzle body and into the electrode piece. The inner-nozzle liquid tube is also made of an insulating material to isolate ground potential of the liquid delivery tube from the high voltage of the air delivery. Both the liquid connecting tube and the inner-nozzle liquid tube are not integrated into the nozzle and are easily removable and replaceable.

The module is designed to be easily configurable for optimal use under varying conditions. The module has a removable electrode that screws into the front of the nozzle body. By replacing one electrode with another electrode with a different opening size, the spray module can be optimized for the most efficient spraying, based on the type or stage of a crop. Since varying the size of the opening in a nozzle affects the amount of airflow, a vineyard in springtime with small plants will need a spray with less flow than one later in the season. For greater flexibility, each nozzle can have a different sized orifice. The replaceable electrode also carries the added benefit of being easy to clean. Once the power is disconnected, the electrode can be removed for cleaning without requiring opening up the protective casing. The nozzle can be loosened and tightened either by hand or by widely available tools.

The module is also easily configurable to alter the spacing between the spray nozzles. Under one configuration of the invention, the nozzle openings in the protective casing are spaced four inches apart and consequently the nozzle holes in the air delivery tube and the liquid tube connecting holes in the liquid delivery system are four inches apart. For different crops and different conditions may have different nozzle requirements for the most optimal delivery of the liquid. For example, if the module is used at a golf course, all the nozzles can be used for full coverage over a flat surface with a nozzle every four inches. For a cotton crop, where the rows are spaced such that a nozzle every twelve inches would provide adequate coverage, only every third nozzle needs to be used. Nozzle holes that are not needed can be plugged by placing a nozzle body without air channel holes in place of a regular nozzle and capping the corresponding hole in the liquid delivery tube. The replaceable electrode has a further benefit in production of the module, allowing for mass production of the modules in a generic format, with the size of the orifice selectable later.

Improved performance is another focus of the new spray module. A removable electrode attaches to the front end of the nozzle body. As the atomized liquid passes through the opening in the electrode's flat head the liquid is charged. The thickness of the flat head of the electrode produces a relatively strong electrical field, compared to the field produced in prior art nozzles. In the prior art nozzle, shown in FIG. 1, the electrode 2 has a thickness of approximately 0.050 inches as compared to a thickness of 0.25 inches for the electrode in the preferred embodiment of the invention. The thicker the electrode, the longer time the atomized liquid passes through it and consequently, the stronger the charge obtained by the liquid. A stronger charge by the liquid leads to both a wider dispersal of the liquid droplets and a stronger adherence to the target crops. An electrode with greater surface area will be less affected by residues that build up on the electrode during operation. The inexpensive and replaceable electrodes also make cleaning of the residue easy and efficient. An operator can, for example, have two sets of the electrodes, allowing one set to soak while a fresh set is used, thereby eliminating downtime of the spray module for cleaning.

The module also increases performance over prior art nozzles by featuring a true center liquid delivery system. The liquid is fed directly down the center of the nozzle body by the inner-nozzle liquid tube, coaxial to the nozzle body. The end of the inner-nozzle liquid tube fits into the electrode at the end of the nozzle body. Unlike the prior art where the liquid is fed down the nozzle at a slant, the liquid in the module follows a straight path through the nozzle and out the nozzle bore. The straight path of the liquid leads to a spray area that is centered around the nozzle, as opposed to a slightly off-centered spray that can result from a liquid delivery that comes through the nozzle at a slant.

The clean design of the module leads to a low cost of manufacturing with the simple delivery system built with strong, durable and inexpensive materials, such as aluminum for the air delivery pipe and the nozzle body, as well as PVC for the protective casing. The module expects to lead to a system where the cost can be reduced by as much as 50%. A significantly lower cost will extend the use of electrostatic sprayers from high-cash crops into use for commodity crops.

The foregoing and other objects, features and advantages of the invention will become more readily apparent from the following detailed description of a preferred embodiment of the invention, which proceeds with reference to the accompanying drawings.

DETAILED DESCRIPTION

The Electrostatic Spray Module

Figure 2:
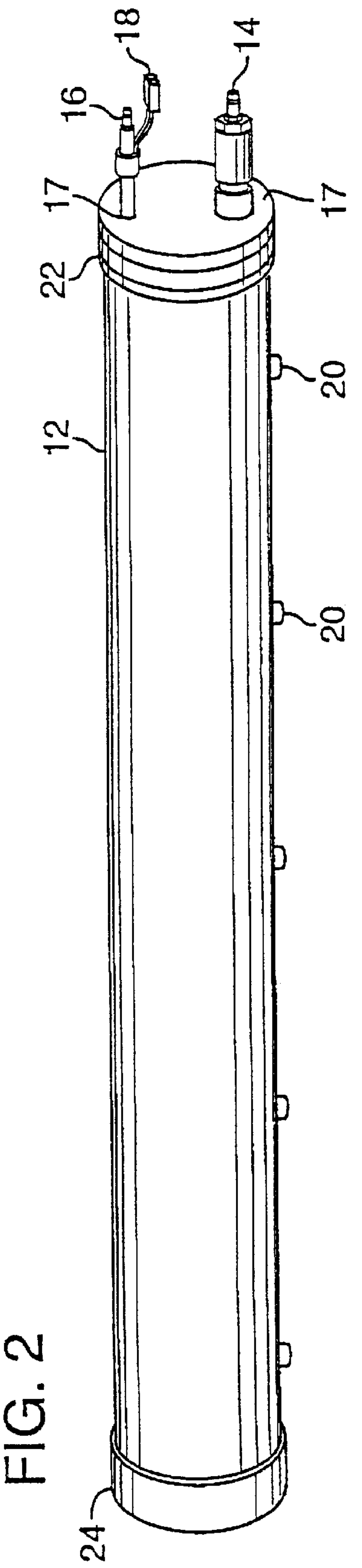
FIG. 2 is a diagram of an external view of the electrostatic spray module according to the present invention.

FIG. 2 is a diagram of an external view of an electrostatic spray module according to the present invention. The invention is designed such that, for normal operation, the user of the sprayer, such as a farmer, would only need to interface with the module from its external components. The spray module features a protective casing made up of a cylindrical shell 12, a top casing cap 22 and a bottom casing cap 24. The top casing cap 22 has two openings 17, providing external access for the inputs of the spray module. The inputs of the spray module are a liquid supply inlet 16, a gas supply inlet 14 and an electrical input 18. The cylindrical shell 12 has nozzle openings 20 spaced at a periodic distance from each other, exposing the nozzles, whereby the electrostatic spray nozzles will spray crops with electrostatically charged liquid.

The spray module can be of any length and have any number of nozzle openings 20. It is expected that spray modules will range from two to more than a dozen nozzle openings. It is expected that the spray modules will be mounted on trailers. Several spray modules may be mounted on a single boom of a trailer. If, for example, there are four spray modules, each with five nozzle openings, the user could mount two spray modules on each boom for a configuration featuring ten nozzle openings on each boom. Each spray module requires only three input hook ups, regardless of the number of nozzle openings on the spray module. The first input is to a liquid supply such as a pesticide, through the liquid supply inlet 16. The second input is to a gas supply, preferably compressed air, through the gas supply inlet 14. The third input is to a low voltage power source, through the electrical input 18.

The cylindrical shell 12 provides a clean and dry environment for the internal components of the spray module. It should be made of a non-conductive, durable, impermeable and inexpensive material, such as PVC. The preferred cylindrical shape of the shell provides a function for the spray module, inhibiting voltage from crawling from the tip of the nozzle 44 to the boom of the tractor where the shell is mounted, as the voltage attempts to return to ground. Adel fins (not shown) may be added to improve the inhibiting of voltage returning to ground. The top casing cap 22 and the bottom casing cap 24 should also be made of a non-conductive material, since they are housing components at a high voltage. The cylindrical shell 12 inhibits mechanical damage, and degradation from sunlight, heat, chemicals and water. The elimination of external wires and hoses makes external cleaning significantly easier.

Figure 3:
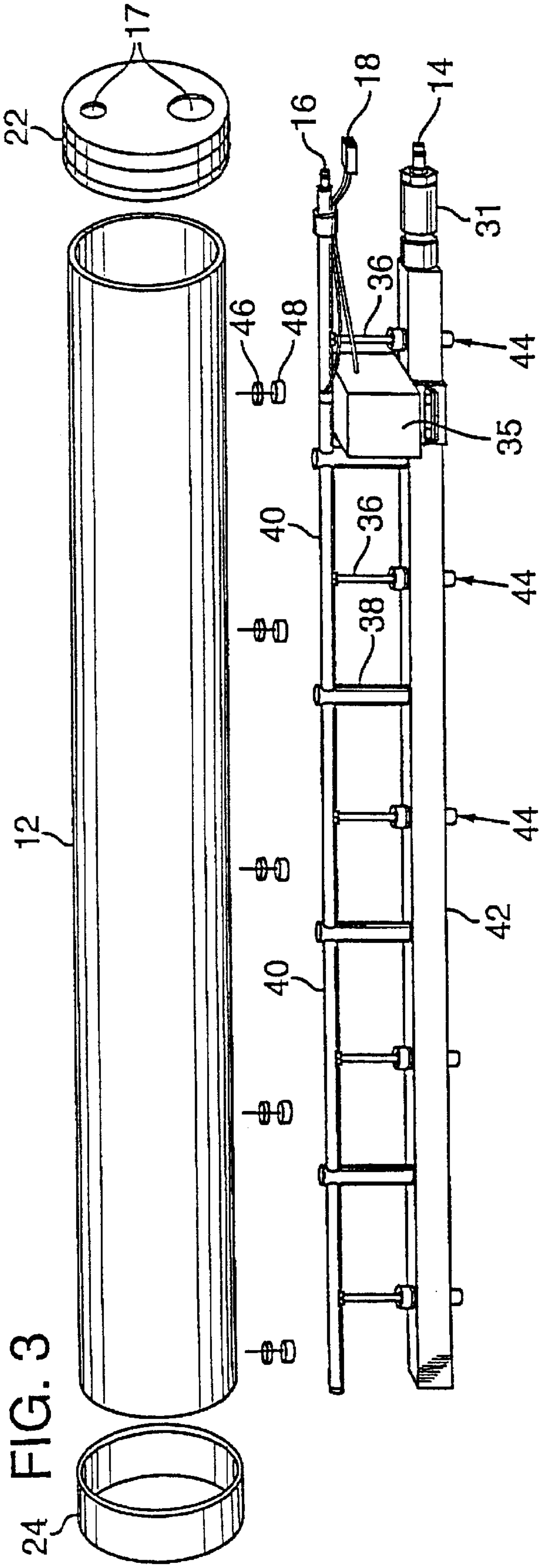
FIG. 3 is a diagram of the components of the electrostatic spray module shown in FIG. 2.

FIG. 3 is an expanded view of the module shown in FIG. 2 also showing the internal components of the electrostatic spray module. The top casing cap 22 and the bottom casing cap 24 are removable from the cylindrical shell 12. Upon removal of the top casing cap 22, an inner structure of the spray module can be removed by sliding the structure axially out of the shell. The inner structure is secured within the cylindrical shell by a lock nut 46 and further protected by a nozzle cap 48. The inner structure of the spray module features two parallel pipes, a liquid delivery pipe 40 and a gas delivery pipe 42, rigidly fixed to each other by a series of insulated standoffs 38. Mounted into the gas delivery pipe 42 at a periodic distance are electrostatic spray nozzles 44. In the preferred embodiment of the invention, nozzles 44 can be mounted approximately every four inches. If the user desires to space the nozzles every eight inches for example, every other nozzle can be replaced with a plug. A plug, in the preferred embodiment of the invention will simply be a nozzle body that does not have holes in the side to receive airflow from the air delivery pipe 42. The openings in the liquid delivery pipe 40 can be capped with capping screws (not shown). The ability to plug holes allows for variable nozzle spacing at a granularity of the distance of the nozzle openings.

The nozzles 44 require three inputs: a liquid, a gas and a high voltage input. The inner structure of the spray module serves functionally to deliver these three inputs to the nozzles 44 with the clean and easy to maintain design of the two parallel pipes. The two pipes connected by the insulated standoffs 38 also provide rigidity for the structure.

The liquid delivery pipe 40 serves to carry liquid the length of the spray module for use by the nozzles 44. The liquid delivery pipe 40 has a liquid supply inlet 16 at one end, providing the external connection for the liquid supply. The liquid delivery pipe 40 also carries ground potential along it, keeping the liquid flowing through it at ground potential. Therefore, the liquid delivery pipe 40 is made of a conductive material, such as brass. Carrying ground potential through the liquid delivery pipe 40 and to the nozzle 44 thorough the liquid eliminates the need for a separate connection to ground for each nozzle. The liquid delivery pipe 40 is connected to ground from a connection to the electrical input 18 which receives ground from a low voltage power supply. Prior art nozzles rely on the liquid maintaining a ground potential naturally. The module, by having the liquid delivery tube connected to ground, ensures that the liquid maintains a ground potential. The further that the liquid strays from ground potential, the less of a current in the spray, decreasing the effectiveness of the spray module. The preferred embodiment of the invention has a blow out port (not shown) at the end of the liquid delivery pipe for easy cleaning.

When a spray module, according to the present invention is used for agricultural purposes, the liquid will be an agricultural liquid such as a pesticide, an herbicide, liquid fertilizer or a crop protection material.

The gas delivery pipe 42 carries gas the length of the spray module for use by the nozzles 44. The gas delivery pipe 42 receives gas from a gas supply inlet 14 connected at one end, providing the external connection to the gas supply. The gas delivery pipe is also used to carry high voltage to the nozzles. Therefore, the gas delivery pipe 42 must be made of a conductive material, such as aluminum. In the preferred embodiment, the gas delivery pipe is made of aluminum, due to the low cost and light weight of the material. Further, the gas delivery pipe is anodized to prevent corrosion and provide insulation. The high voltage runs between the layers of the anodize coating and will not arc to other components in the assembly. The gas delivery pipe 42 serves as a conductive raceway for high voltage, therefore eliminating the many exposed high voltage connections in the prior art.

Since the gas delivery pipe 42 will be carrying high voltage, the conductive gas delivery pipe 42 must not be exposed above the top casing cap 22. A gas pipe connector 31 made of a non-conductive material, such as PVC, should be used to connect the gas delivery pipe 42 to the gas supply inlet 14. The gas delivery pipe is preferably square to allow for the electrostatic spray nozzles 44 to be mounted in the gas delivery pipe 42 while an adequately seal to avoid air escape around the outside of the nozzles 44. (See FIG. 4.) The use of a gas delivery pipe 42 integrated with nozzles 44 eliminates the need for a separate connection to each nozzle for delivering gas. In the preferred embodiment, the gas is compressed air at 15 to 70 pounds per square inch, depending on the application, to deliver adequate force for projecting the spray out of the nozzle.

The power supply 35 generates a high voltage signal from a low voltage input. The low voltage input comes from the electrical input 18 connected to a low voltage power source. The power supply 35 generates a high voltage signal of approximately 1000 volts, which is sufficient to effectively charge the electrostatic spray nozzles 44. In the preferred embodiment, the power supply 35 is a self-regulating power supply, varying based on the current drawn by the nozzles. The power supply is able to regulate to provide adequate charging of the electrostatic spray for a range of all common agricultural chemicals under real agricultural conditions. Different agricultural chemical will have a different conductivity resulting in different draws upon the power supply. The output of the power supply is connected to the gas delivery pipe 42 for distribution of the high voltage signal to the nozzles 44. The use of the gas delivery pipe 42 to distribute the high voltage signal to all nozzles eliminates high voltage wires. Further, only a single power supply in a clean, dry and safe enclosure is needed for several nozzles 44.

The Electrostatic Spray Nozzle

Figure 4:
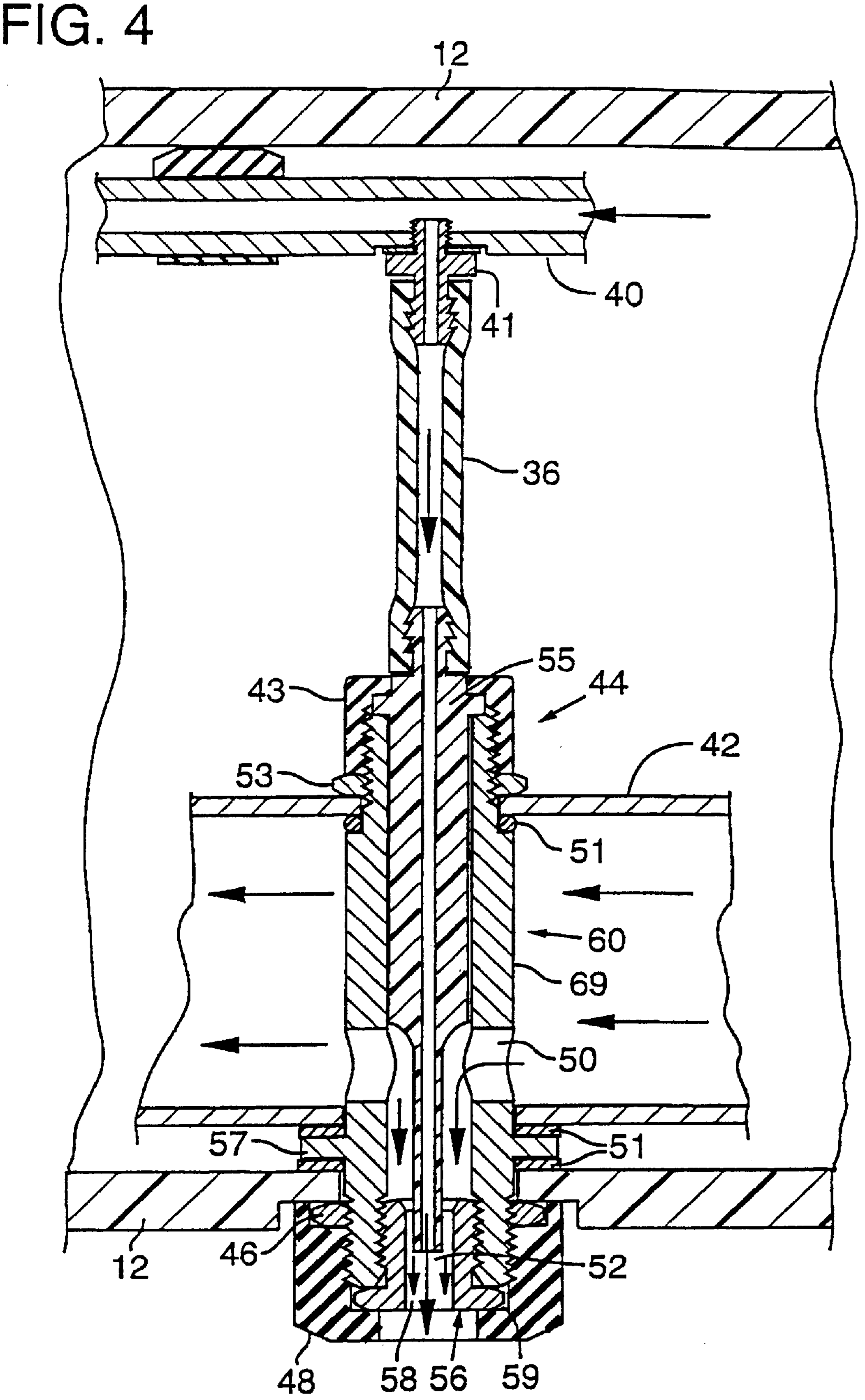
FIG. 4 is a diagram of a cross-sectional view of an electrostatic spray nozzle, used in the electrostatic spray module shown in FIG. 3.

FIG. 4 is an enlarged cross-sectional view of a portion of the module showing detail of one of the electrostatic spray nozzle, as it is used in the electrostatic spray module shown in FIG. 3. The electrostatic spray nozzle 44 is comprised of a nozzle body 60, an electrode 56 and an inner-nozzle liquid tube 55.

Figure 5:
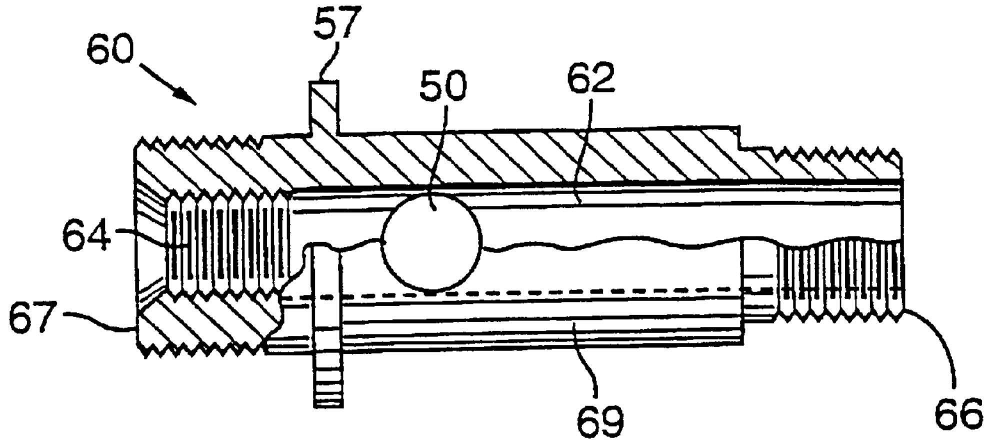
FIG. 5 is a diagram of the body of the electrostatic spray nozzle shown in FIG. 4.

The nozzle body, shown in context of the nozzle in FIG. 4, is also shown in a specification form in FIG. 5. The nozzle body 60 is a cylinder with a hollow passage 62 and made of a conductive material, inserted through openings in the gas delivery pipe 42 and attached at the back end 66 by a screw on liquid attachment cap 43. The front end 67 of the nozzle is then inserted through the nozzle opening of the cylindrical shell 12 and attached by a lock nut 46. A middle section 69 of the nozzle body, when fitted into the gas delivery pipe 42, will be inside of the gas delivery pipe 42. The gas delivery pipe 42 is then sealed by the use of gaskets 51 that ring the nozzle body 60 at the outside of the gas delivery pipe 42. The nozzle body 60 is pushed all the way through the gas delivery pipe 42 until the nozzle anchor 57 prevents further insertion. The nozzle body, being conductive delivers the high voltage signal from the gas delivery pipe 42 to the electrode 56, which is also conductive. The nozzle body provides one half of the means for connecting the electrode to the nozzle body by its electrode threaded screw mount 64. The hollow passage 62 of the nozzle body provides a means for a delivery of a liquid into the nozzle 44.

The nozzle body 60 has two gas channels 50 cut in the side of the body 60 and to provide air flow from the inside of the gas delivery pipe 42 to the hollow passage inside the nozzle body.

In the embodiment shown in FIG. 5, the nozzle body 60 has the following specifications. The length of the nozzle body from front end 67 to back end 66 is 1.770 inches. The length from the front end 67 of the nozzle body to the point where the middle section 69 meets the back end 66 is 1.4 inches. The length from the front end 67 to the center of the gas channels 50 is 0.680 inches. The length from the front end 67 to the back of the nozzle anchor is 0.464 inches. The length from the front end 67 to the front of the nozzle anchor is 0.400 inches. All of these lengths have a tolerance of 0.010 inches. The gas channels 50 have a diameter of 0.218 inches with a tolerance of 0.003 inches. The nozzle body has a diameter at the anchors 57 of 0.750 inches with a tolerance of 0.010 inches. The nozzle body has a diameter across the font end 67 and middle sections 69 of 0.500 inches with a tolerance of 0.006 inches. The nozzle body has an inner diameter in its hollow passage 62 of 0.251 inches with a tolerance of 0.005 inches.

Figure 1:
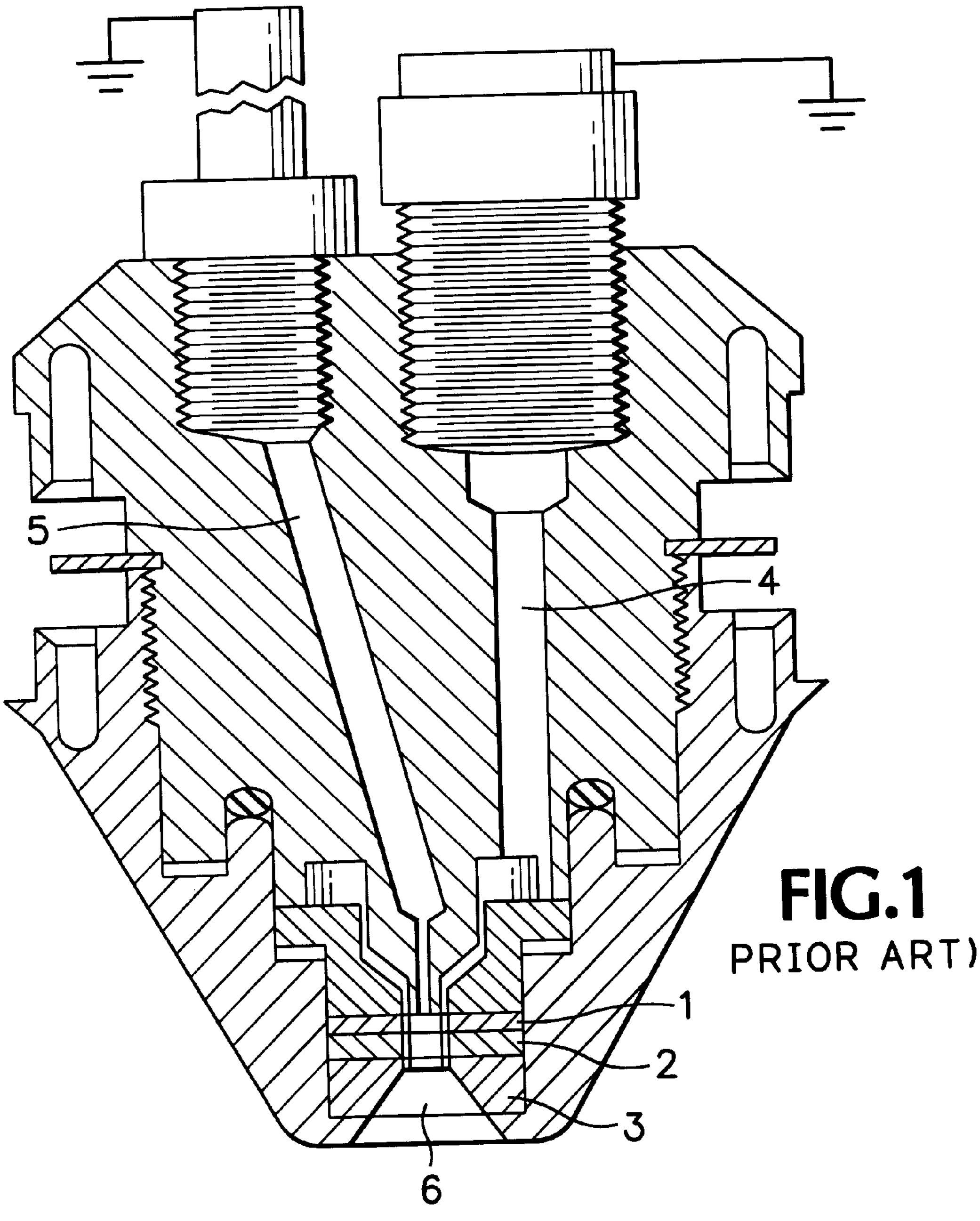
FIG.1 PRIOR ART)
FIG. 1 is a diagram of a prior art nozzle.

The liquid is delivered to the nozzle body via an inner-nozzle liquid tube 55. The inner-nozzle liquid tube 55 is connected to the liquid delivery pipe 40 by a liquid connecting tube 36 that is tapped into the liquid delivery pipe 40 by a liquid tap 41. The liquid connecting tube 36 is made of a non-conductive material, which is preferably flexible, such as soft plastic tubing, to allow for an easy connection to the inner-nozzle liquid tube 55. The liquid connecting tube is connected to the liquid tap 41 by a hose barb fitting on the cap and to the inner-nozzle liquid tube 55 by a hose barb fitting on the inner-nozzle liquid tube 55. The inner-nozzle liquid tube 55 in its implemented form is made of delrin, a dielectric plastic which is machined to fit snuggly within the nozzle body 60. The inner-nozzle liquid tube 55 could also be made of glass or ceramic. Glass and ceramic have the additional feature of being able to be reamed out in cleaning without damaging the inner surface. A glass tube, if used, in order to fit properly within the nozzle body, is fitted into a holding device, such as a dehin tube, that would snugly fit into the nozzle body 60 and have a barbed end for attaching to the liquid connecting tube 36. The inner-nozzle liquid tube 55 is removable from and independent of the nozzle for cleaning or replacement by withdrawing the tube from the back of the nozzle body 60. The removable and independent inner-nozzle liquid tube 55 is distinguished from an opening in the prior art nozzle where the liquid channel 5 in FIG. 1 is an integrated part of the nozzle.

Figure 6A:
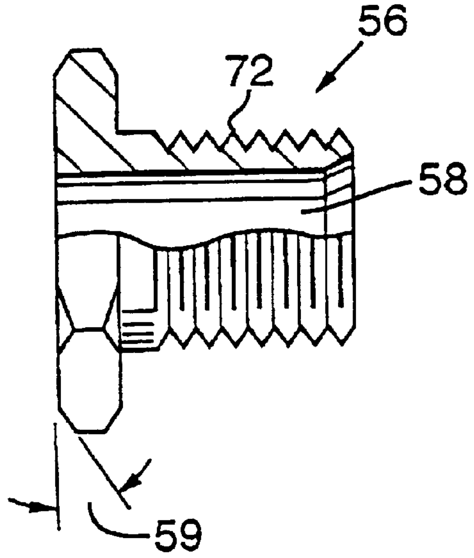
FIG. 6 is a diagram of the electrode of the electrostatic spray nozzle shown in FIG. 4.
Figure 6B:
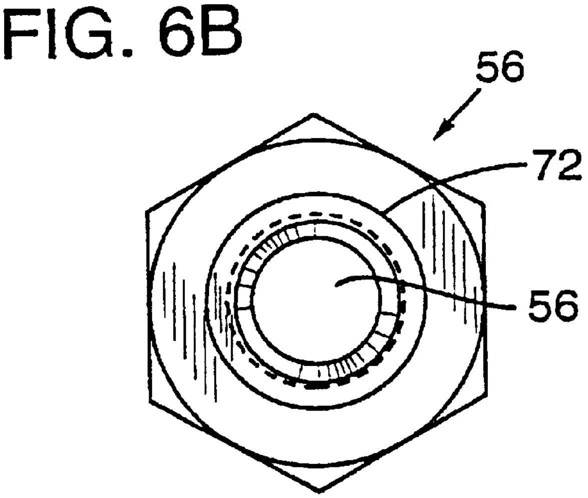

Mounted onto the front of the nozzle body 60 is the electrode 56 shown in context of the nozzle in FIG. 4, is also shown in a specification form in FIG. 6A and FIG. 6B. The electrode is mounted by screwing the electrode 56 into the nozzle body 60 using the electrode screw threads 72. The electrode is made of a conductive material, receiving the high voltage charge from the nozzle body 60. In the preferred embodiment, the electrode is made of stainless steel. To keep costs down, in the preferred embodiment only the electrode is made of the more costly stainless steel, while the nozzle body 60 is made aluminum, which is less expensive and easier to machine. Stainless steel is preferred for the electrode due to its effective properties in inducing a charge on the liquid and for its durability. The inner wall of the electrode 56 is a smooth surface to allow laminar air flow.

The inner wall of the electrode provides a smooth surface made of only one material: the high-grade stainless steel. The smooth, single material design provides optimal flow characteristics through for the passage of the liquid all the way from the atomization stage, through the induction stage and through the opening of nozzle. Prior art systems, such as those shown in FIG. 1 have difficulties, as described above, from the use of multiple materials, including plastic, along the passage out of the nozzle.

In the inner chamber of the electrode the three inputs of the spray module come together. The inner-nozzle liquid tube 55 extends into the electrode 56. Liquid passing out of the inner-nozzle liquid tube 55 mixes in a mixing region 52 with gas flowing in the gas channels 50 of the nozzle body 60 to form an atomized spray comprising small droplets of the liquid. The atomized spray then passes through the electrode 56 which is charged with high voltage, thereby inducing a charge on the atomized liquid by the process of electrical induction and forming the electrically charged electrostatic spray. The head of the electrode 59 provides the majority of the induction. The thicker the head of the electrode the stronger the charge induced on the electrostatic spray and therefore, the better adherence of the spray to the crops. The preferred embodiment of the module features and electrode head 59 with a thickness of 0.25 inches.

The electrostatic spray flows out of the nozzle through the electrode orifice 58. The size of the orifice controls the airflow out of the nozzle and therefore controls the distance and the span of the spray. A narrower orifice will result in a farther but more focussed spray, while a wider orifice will result in a shorter and more dispersed spray. Under different field conditions, described above, it may be desirable to alter the size of the orifice and thereby alter the type of resulting spray. The electrode 56 can be removed from the nozzle 44 externally from the spray module, that is, not needing to open up the protective casing 12, 22, 24. After unplugging the voltage connection to the spray module, the electrode 56 is easily screwed off by hand or a common tool.

In the embodiment shown in FIG. 6A and FIG. 6B, the electrode 56 has the following specifications. The electrode has a length perpendicular to its axis of 0.340 inches with a tolerance of 0.010 inches. The electrode head 59 has a width of 0.70 inches with a tolerance of 0.005 inches. The orifice 58 has a diameter of 0.147 inches with a tolerance of 0.001.

The Regulating Power Supply

Figure 7:
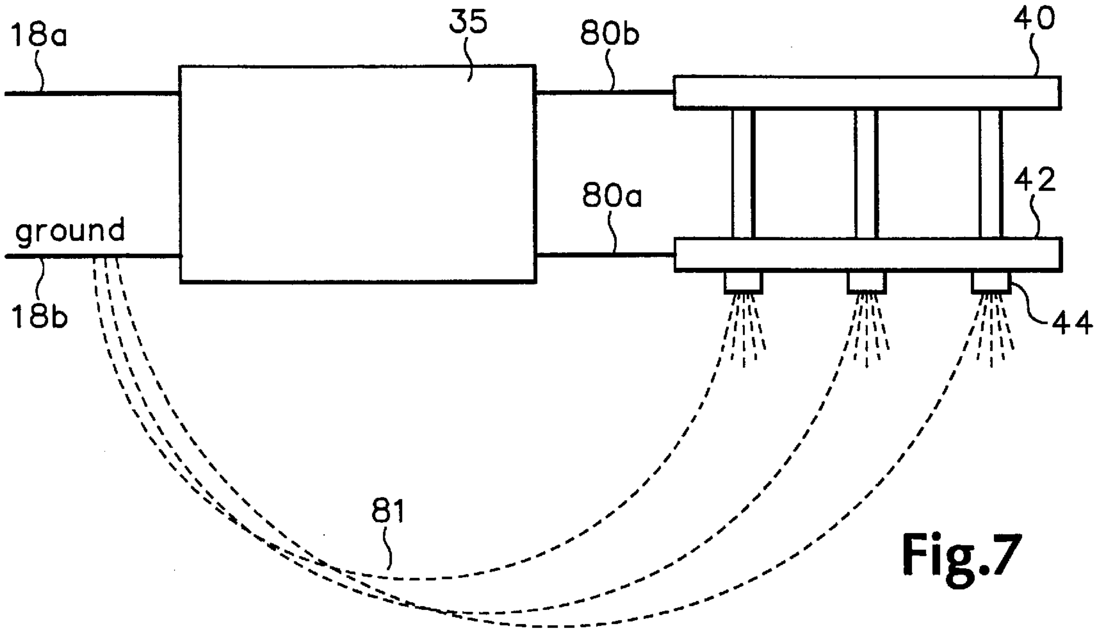
FIG. 7 is a diagram showing the regulating power supply of FIG. 3.

FIG. 7 shows the regulating power supply of FIG. 3. The power supply 35 uses a simple flyback circuit to convert a low voltage DC input 18*a* into a high voltage DC output 80*a*. The invention has two ground return paths 18*b* and 80*b*. The first ground return path 18*b* is the ground of the sprayer module, which is hooked to the frame of the unit carrying the spray module. The second ground return path 80*b* is connected to the liquid supply pipe 40 to keep the liquid at ground potential.

In operation, a liquid, such as an agricultural chemical, with a significant degree of conductivity can create an external current path 81 toward the first ground return path. Over time, this current path may increase over time causing damage. The power supply 35 limits the current from this current path 81 by using a current limiting circuit within the power supply 35. Meanwhile, the other ground return path 80*b* remains unregulated. The use of the current limiting circuit on only one ground return path 18*b* allows for a constant high voltage signal to be delivered to the nozzles 44 over the air supply pipe 42.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. A method for spraying crops with an electrostatically charged liquid with an electrostatic spray module, the method comprising the steps:

converting a low voltage from a low voltage power source to a high voltage signal, the low voltage power source connected to the electrostatic spray module;

delivering the high voltage signal to an electrostatic spray nozzle across a gas delivery pipe made of an electrically conductive material;

carrying a ground voltage across a liquid delivery tube made of an electrically conductive material;

delivering a liquid to the spray nozzle through the liquid delivery tube, the liquid drawn from a liquid supply connected to the electrostatic spray module;

delivering compressed air to the nozzle through the gas delivery tube, the compressed air delivered from a supply of compressed air connected to the electrostatic spray module;

mixing the liquid and the compressed air in the spray nozzle to form an atomized liquid;

charging the atomized liquid by an electrode in the spray nozzle, the electrode charged by the high voltage signal delivered to the nozzle;

spraying the crop with the charged atomized liquid.

2. A method according to claim 1, wherein the step of delivering the high voltage signal is done to a plurality of electrostatic spray nozzles;

the step of delivering the liquid is done to the plurality of nozzles;

the step of delivering compressed air is done to the plurality of nozzles the step of mixing occurs in the plurality of nozzles;

the step of charging the atomized liquid occurs in the plurality of nozzles.

* * * * *